US012343993B2

(12) United States Patent
Yoshita

(10) Patent No.: US 12,343,993 B2
(45) Date of Patent: Jul. 1, 2025

(54) LIQUID DISCHARGE HEAD, LIQUID DISCHARGE DEVICE, AND LIQUID DISCHARGE APPARATUS

(71) Applicant: Akio Yoshita, Kanagawa (JP)

(72) Inventor: Akio Yoshita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 201 days.

(21) Appl. No.: 18/209,487

(22) Filed: Jun. 14, 2023

(65) Prior Publication Data

US 2023/0405991 A1 Dec. 21, 2023

(30) Foreign Application Priority Data

Jun. 16, 2022 (JP) ................................ 2022-097530
Mar. 30, 2023 (JP) ................................ 2023-056110

(51) Int. Cl.
*B41J 2/14* (2006.01)

(52) U.S. Cl.
CPC .. *B41J 2/14233* (2013.01); *B41J 2002/14258* (2013.01)

(58) Field of Classification Search
CPC .......... B41J 2/14233; B41J 2002/14258; B41J 2002/14241; B41J 2002/14362; B41J 2002/14419; B41J 2202/12
See application file for complete search history.

(56) References Cited

U.S. PATENT DOCUMENTS

| | | | |
|---|---|---|---|
| 2015/0375505 A1 | 12/2015 | Takahashi | |
| 2021/0370675 A1 | 12/2021 | Yoshita et al. | |
| 2023/0034778 A1 | 2/2023 | Yoshita | |
| 2023/0157177 A1 | 5/2023 | Hirabayashi et al. | |

FOREIGN PATENT DOCUMENTS

| | | |
|---|---|---|
| JP | 2015-085565 | 5/2015 |
| JP | 2016-026912 | 2/2016 |
| JP | 2017132237 A * | 8/2017 |
| JP | 2023-073801 | 5/2023 |

OTHER PUBLICATIONS

Watanabe, "Liquid Discharge Head, Liquid Discharge Unit and Device Discharging Liquid", Aug. 3, 2017, Description of Embodiments (Year: 2017).*

* cited by examiner

*Primary Examiner* — Lisa Solomon
(74) *Attorney, Agent, or Firm* — XSENSUS

(57) ABSTRACT

A liquid discharge head includes a piezoelectric element, a first holding substrate, a second holding substrate, and damper. The first holding substrate has a recess accommodating the piezoelectric element, a first partition having a first width in a width direction of the first partition, and first side spaces partitioned by the first partition. The second holding substrate has a second partition having a second width wider than the first width in the width direction and second side spaces partitioned by the second partition. The damper is disposed between the first holding substrate and the second holding substrate. The damper has a first surface facing the first holding substrate, a second surface opposite to the first surface, and a penetrating portion penetrating through the damper. The second surface is bonded to the second partition of the second holding substrate. The penetrating portion is disposed adjacent to the second partition.

11 Claims, 18 Drawing Sheets

COMPARATIVE EXAMPLE

COMPARATIVE EXAMPLE

COMPARATIVE EXAMPLE

LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2022-097530, filed on Jun. 16, 2022, and 2023-056110, filed on Mar. 30, 2023, in the Japan Patent Office, the entire disclosure of each of which is hereby incorporated by reference herein.

BACKGROUND

Technical Field

Embodiments of the present disclosure relate to a liquid discharge head, a liquid discharge device, and a liquid discharge apparatus.

Related Art

In the related art, an inkjet image forming apparatus includes a liquid discharge head. The liquid discharge head includes a liquid chamber substrate, a piezoelectric element holding substrate, a damper, and a damper holding substrate. The liquid chamber substrate defines an individual liquid chamber communicating with a nozzle. The piezoelectric element holding substrate is bonded to the liquid chamber substrate on a side opposite to a nozzle plate having the nozzle. The piezoelectric element holding substrate defines a recess accommodating a piezoelectric element. The damper dissipates vibration energy to dampen impact or amplitude of vibration.

SUMMARY

Embodiments of the present disclosure describe an improved liquid discharge head that includes a piezoelectric element, a first holding substrate, a second holding substrate, and damper. The first holding substrate has a recess accommodating the piezoelectric element, a first partition having a first width in a width direction of the first partition, and first side spaces partitioned by the first partition. The second holding substrate has a second partition having a second width wider than the first width in the width direction and second side spaces partitioned by the second partition. The damper is disposed between the first holding substrate and the second holding substrate. The damper has a first surface facing the first holding substrate, a second surface opposite to the first surface, and a penetrating portion penetrating through the damper. The second surface is bonded to the second partition of the second holding substrate. The penetrating portion is disposed adjacent to the second partition.

According to another embodiment of the present disclosure, there is provided a liquid discharge head that includes a piezoelectric element, a first holding substrate, a second holding substrate, and damper. The first holding substrate has a recess accommodating the piezoelectric element, a first side wall having a first width in a width direction of the first side wall, and a first side space defined by the first side wall. The second holding substrate has a second side wall having a second width wider than the first width in the width direction and a second side space defined by the second side wall. The damper is disposed between the first holding substrate and the second holding substrate. The damper has a first surface facing the first holding substrate, a second surface opposite to the first surface, and a cutout penetrating through the damper. The second surface is bonded to the second side wall of the second holding substrate. The penetrating portion is disposed adjacent to the second side wall.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
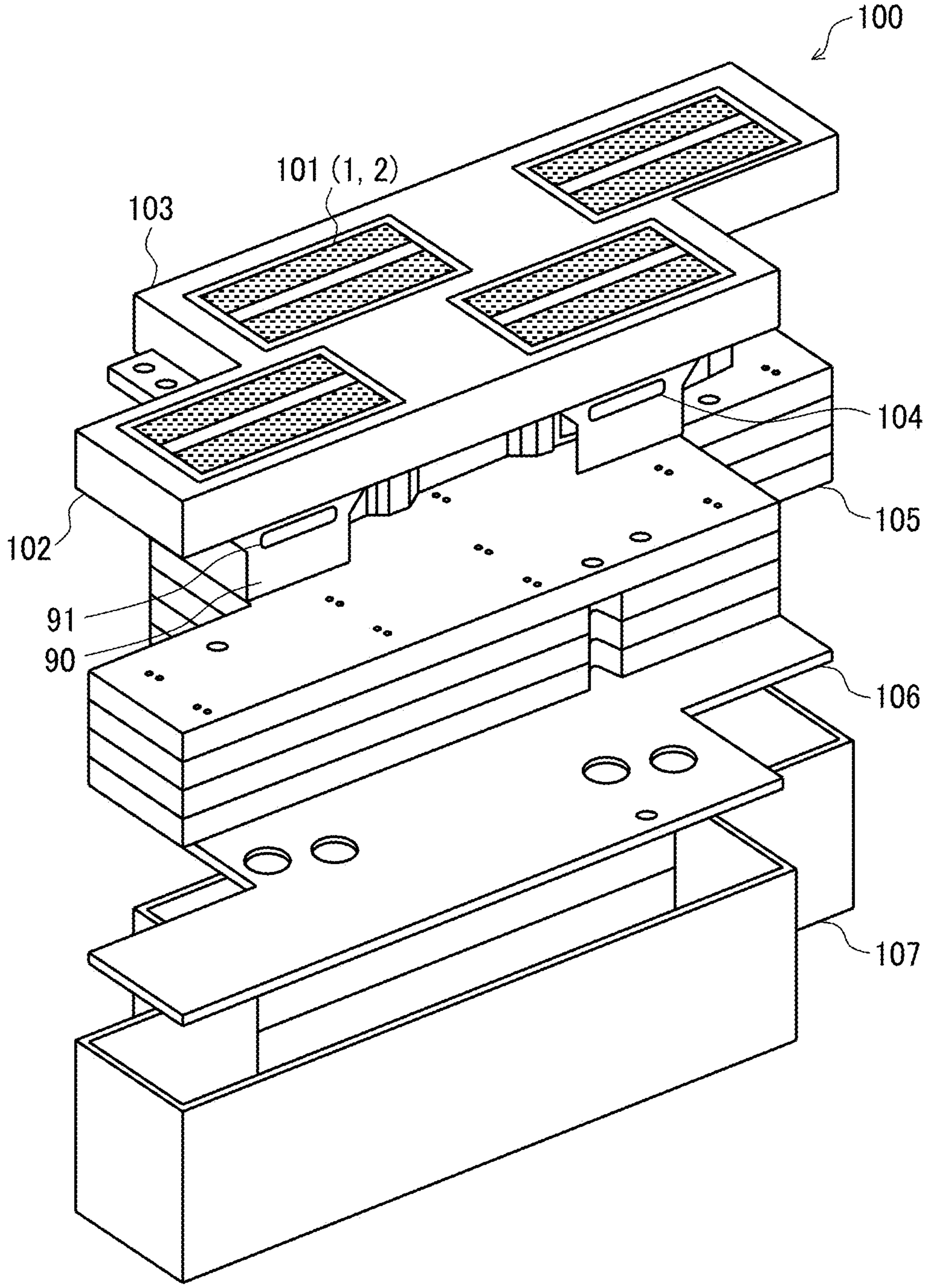
FIG. 1 is a schematic exploded perspective view of a liquid discharge device including a liquid discharge head according to a comparative example and embodiments of the present disclosure as viewed from a nozzle face side.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a." "an," and "the" are intended to include the plural forms as well, unless the context clearly indicates otherwise.

Figure 2:
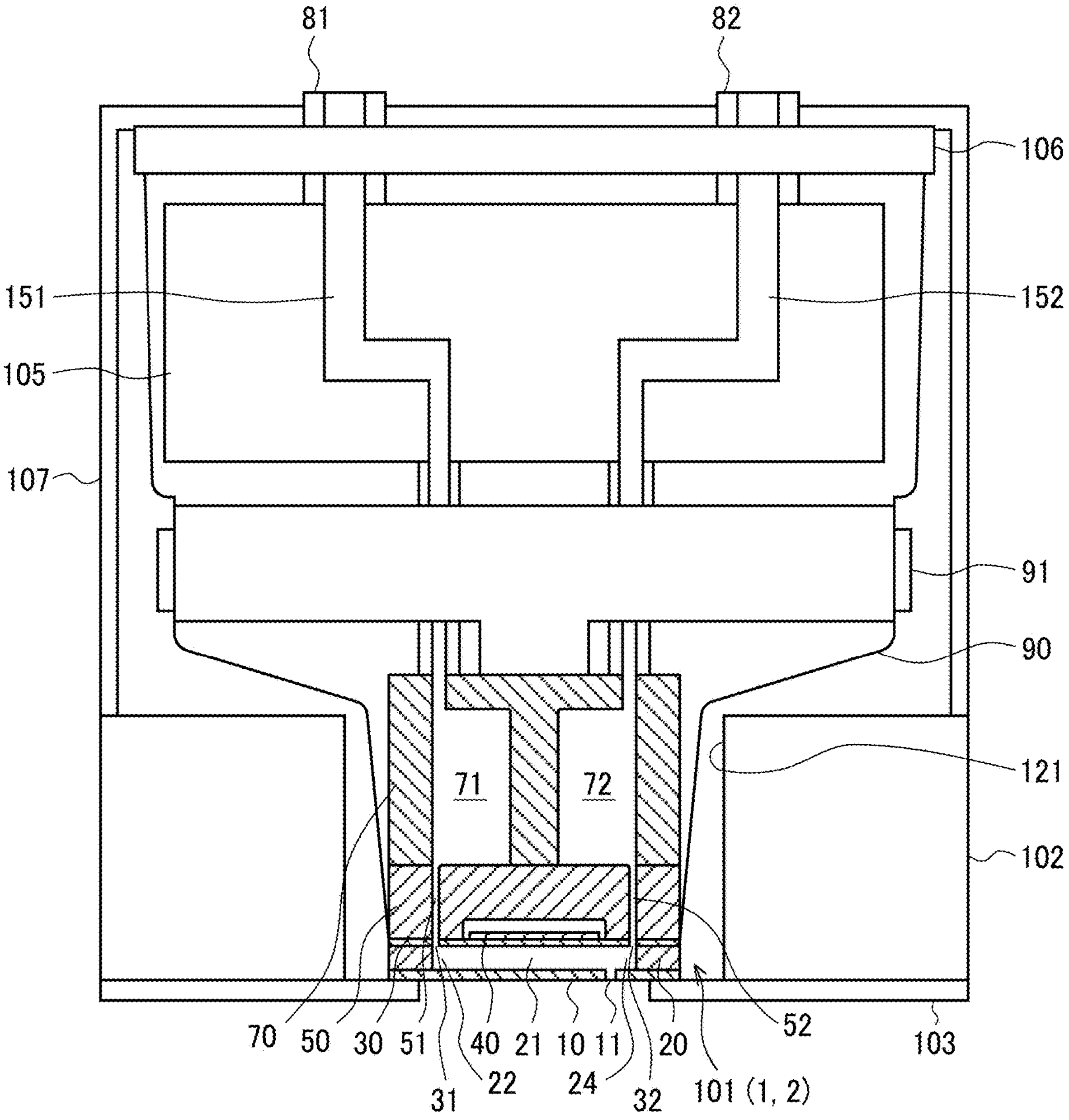
FIG. 2 is a schematic cross-sectional view of the liquid discharge device in a transverse direction of the liquid discharge head according to the comparative example and the embodiments of the present disclosure.

FIG. 1 is a schematic exploded perspective view of a liquid discharge device 100 including a liquid discharge head 101 according to a comparative example. A liquid discharge head 1 or 2 according to embodiments of the present disclosure can also applied to the liquid discharge device 100 instead of the liquid discharge head 101. FIG. 2 is a schematic cross-sectional view of the liquid discharge device 100 in a transverse direction of the liquid discharge head 101. In FIG. 1, the liquid discharge device 100 includes the multiple liquid discharge heads 101 that discharge a liquid, a base 102 that holds the multiple liquid discharge heads 101, a cover 103 serving as a nozzle cover that covers the multiple liquid discharge heads 101. The liquid discharge device 100 further includes a heat dissipator 104, a manifold 105 defining channels to supply the liquid to the multiple liquid discharge heads 101, a printed circuit board (PCB) 106 coupled to the flexible wiring 90 including a driver integrated circuit (IC) 91, and a module case 107.

Each of the multiple liquid discharge heads 101 includes a nozzle plate 10, a channel substrate 20, a diaphragm 30, a piezoelectric element holding substrate 50, and a common channel frame 70, for example. Nozzles 11 are formed in the nozzle plate 10. The channel substrate 20 defines individual chambers 21 serving as pressure chambers communicating with the nozzles 11, respectively. The diaphragm 30 includes piezoelectric elements 40. The piezoelectric element holding substrate 50 is laminated over the diaphragm 30. The common channel frame 70 is laminated over the piezoelectric element holding substrate 50.

In addition to the individual chambers 21, the channel substrate 20 defines supply-side individual channels 22 communicating with the individual chambers 21 and collection-side individual channels 24 communicating with the individual chambers 21, respectively.

Figure 3:
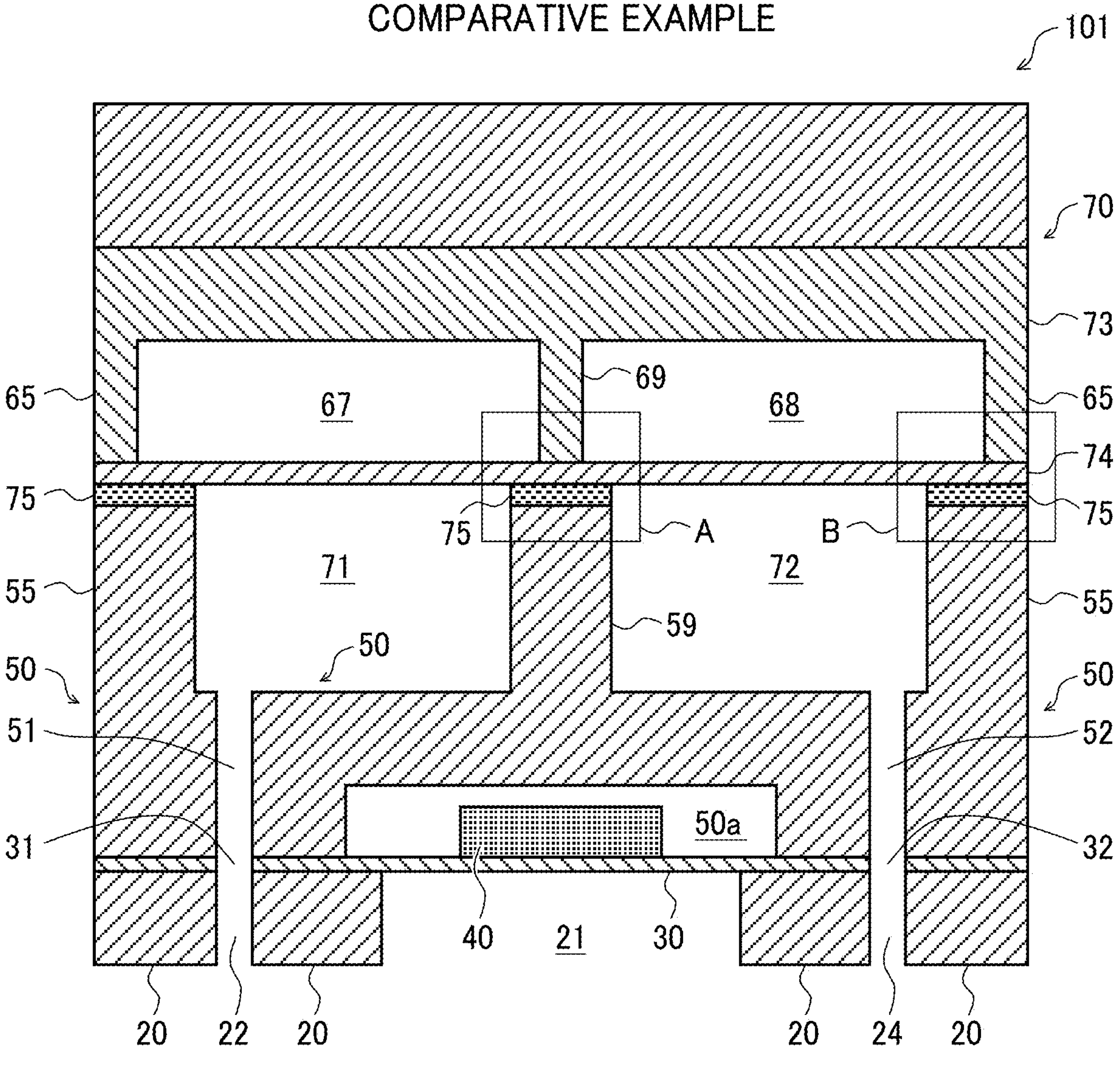
FIG. 3 is a schematic cross-sectional view of a portion of the liquid discharge head between a channel substrate and a common channel frame according to the comparative example.

The piezoelectric element holding substrate 50 defines supply-side intermediate individual channels 51 and collection-side intermediate individual channels 52. The supply-side intermediate individual channels 51 communicate with the supply-side individual channels 22 via openings 31 of the diaphragm 30. The collection-side intermediate individual channels 52 communicate with the collection-side individual channels 24 via openings 32 of the diaphragm 30. As illustrated in FIG. 3, the piezoelectric element holding substrate 50 defines a recess 50*a* to accommodate the piezoelectric elements 40.

The piezoelectric element holding substrate 50 and the common channel frame 70 defines a supply-side common channel 71 and a collection-side common channel 72 as first side spaces, and second side spaces 67 and 68 described later. The supply-side common channel 71 communicates with the supply-side intermediate individual channels 51. The collection-side common channel 72 communicates with the collection-side intermediate individual channels 52.

The supply-side common channel 71 communicates with a supply port 81 via a channel 151 of the manifold 105, and the collection-side common channel 72 communicates with a collection port 82 via a channel 152 of the manifold 105. The PCB 106 and the piezoelectric elements 40 are connected to each other via a flexible wiring 90, and the driver IC 91 is mounted on the flexible wiring 90.

In the liquid discharge head 101, a liquid (ink) in the supply-side common channel 71 is supplied to each individual chamber 21 communicating with each nozzle 11, and the piezoelectric element 40 corresponding to each individual chamber 21 is driven to generate energy so as to increase a pressure of the liquid (ink) in each individual chamber 21, thereby discharging the liquid from the nozzle 11. At this time, if pressure fluctuation of the liquid (ink) generated in the individual chamber 21 is propagated to the supply-side common channel 72 communicating with each individual chamber 21 as vibration (i.e., vibration energy of the liquid), mutual interference affecting the liquid (ink) in the adjacent individual chambers 21 may occur due to the propagated vibration, causing leakage, unintended discharge, or unstable discharge of the liquid (ink) from the nozzle 11. As a result, a high quality image may not be obtained.

In the comparative example, the multiple liquid discharge heads 101 (multiple liquid discharge heads 1 or 2 in the present embodiment) are attached to the base 102 at predetermined intervals. The liquid discharge head 101 is inserted into an opening 121 in the base 102, and the peripheral end of the nozzle plate 10 of the liquid discharge head 101 is bonded and secured to the cover 103, which is bonded and secured to the base 102, to attach the liquid discharge head 101 to the base 102.

A flange provided outside the common channel frame 70 of the liquid discharge head 101 is bonded and secured to the base 102. The liquid discharge head 101 may be secured to the base 102 by bonding, swaging, riveting, screwing, or the like, and not limited to the above-described structure.

In the present embodiment, the base 102 is preferably formed of a material having a low coefficient of linear expansion. Examples of the material having the low coefficient of linear expansion include 42alloy in which nickel is added to iron, an invar material, and the like. In the comparative example and the present embodiment, the invar material is used.

With such a configuration, the liquid discharge head 101 can reduce a displacement of the nozzles 11 from a predetermined nozzle position to reduce a deviation of a landing position of a liquid discharged from the nozzles 11 of the liquid discharge head 101 even if the temperature of the base 102 is increased by heat generated by the liquid discharge head 101 since an amount of thermal expansion of the base 102 is small.

Similarly, each of the nozzle plate 10, the channel substrate 20, and the diaphragm 30 is formed of a silicon single-crystal substrate, and has substantially the same coefficient of linear expansion as that of the base 102. This configuration can reduce the displacement of the nozzle 11 caused by thermal expansion.

FIG. 3 is a schematic cross-sectional view of a portion of the liquid discharge head 101 between the channel substrate 20 and the common channel frame 70. In FIG. 3, the common channel frame 70 includes a damper holding substrate 73 at a lower portion thereof. The damper 74 dampens impact and vibration of the liquid. One face (i.e., a first side) of the damper 74 is bonded to the piezoelectric element holding substrate 50 (i.e., a first holding substrate) with an adhesive 75. The other face (i.e., a second side) of a damper 74 is bonded to the damper holding substrate 73 (i.e., a second holding substrate).

The piezoelectric element holding substrate 50 includes a partition wall 59 as a first partition that separates the supply-side common channel 71 and the collection-side common channel 72. The damper 74 vibrates in the supply-side common channel 71 and the collection-side common channel 72 which are referred to as the first side spaces. The piezoelectric element holding substrate 50 further includes side walls 55 as first side walls disposed at both ends thereof in FIG. 3. The side walls 55 have the same width as the partition wall 59.

The damper holding substrate 73 has a partition wall 69 as a second partition that separates the second side space 67 and the second side space 68. The second side space 67 is opposed to the supply-side common channel 71. The second side space 68 is opposed to the collection-side common channel 72. The damper 74 vibrates in the second side spaces 67 and 68. The damper holding substrate 73 further includes side walls 65 as second side walls disposed at both ends thereof in FIG. 3. The side walls 65 have the same width as the partition wall 69. The first side of the damper 74 is bonded to the side walls 55 and the partition wall 59 with the adhesive 75, and the second side of the damper 74 is bonded to the side walls 65 and the partition wall 69.

Figure 4:
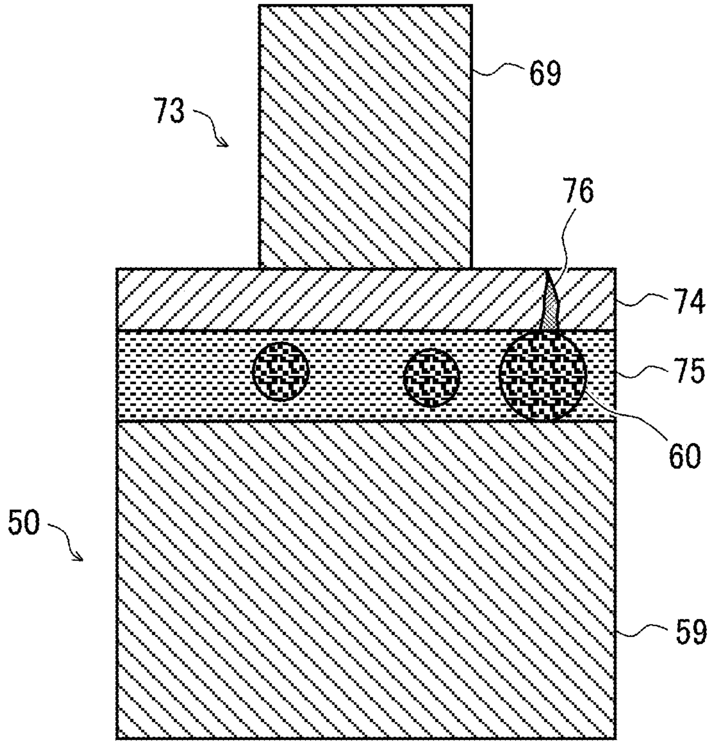
FIG. 4 is an enlarged view of a bonded portion between a piezoelectric element holding substrate, a damper, and a damper holding substrate in a center of the liquid discharge head according to the comparative example.

FIG. 4 is an enlarged view of a portion A in FIG. 3, i.e., a bonded portion between the partition wall 59 of the piezoelectric element holding substrate 50, the damper 74, and the partition wall 69 of the damper holding substrate 73. As illustrated in FIG. 4, the partition wall 59 and the damper 74 are bonded to each other with the adhesive 75. The adhesive 75 used in the present embodiment preferably contains fillers 60 to enhance adhesiveness or adhesive strength. The adhesive 75 illustrated in the comparative example and the present embodiment contains multiple fillers 60 each having a spherical shape, and the maximum particle diameter of the fillers 60 is 10 μm.

The damper holding substrate 73 and the damper 74 are manufactured by a semiconductor process. In the present embodiment, a material of the damper 74 is deposited on a wafer serving as a substrate. A surface of the damper 74 is bonded to the damper holding substrate 73 in which a space is formed by patterning. The damper 74 vibrates in the space.

In a configuration according to the comparative example illustrated in FIG. 4, a width of the partition wall 69 is narrower than a width of the partition wall 59. Accordingly, the filler 60 having a large diameter may be directly sandwiched between the partition wall 59 and the damper 74 at a position where the damper 74 is not backed up by the partition wall 69. At this position, a local stress is applied to the damper 74 by the filler 60, a crack 76 may be generated as illustrated in FIG. 4, and the damper 74 may be damaged. Since the crack 76 occurs in channels in which the liquid flows, a liquid discharge failure may occur in the liquid discharge head 101. Embodiments of the present disclosure for preventing the liquid discharge failure are described below.

Figure 5:
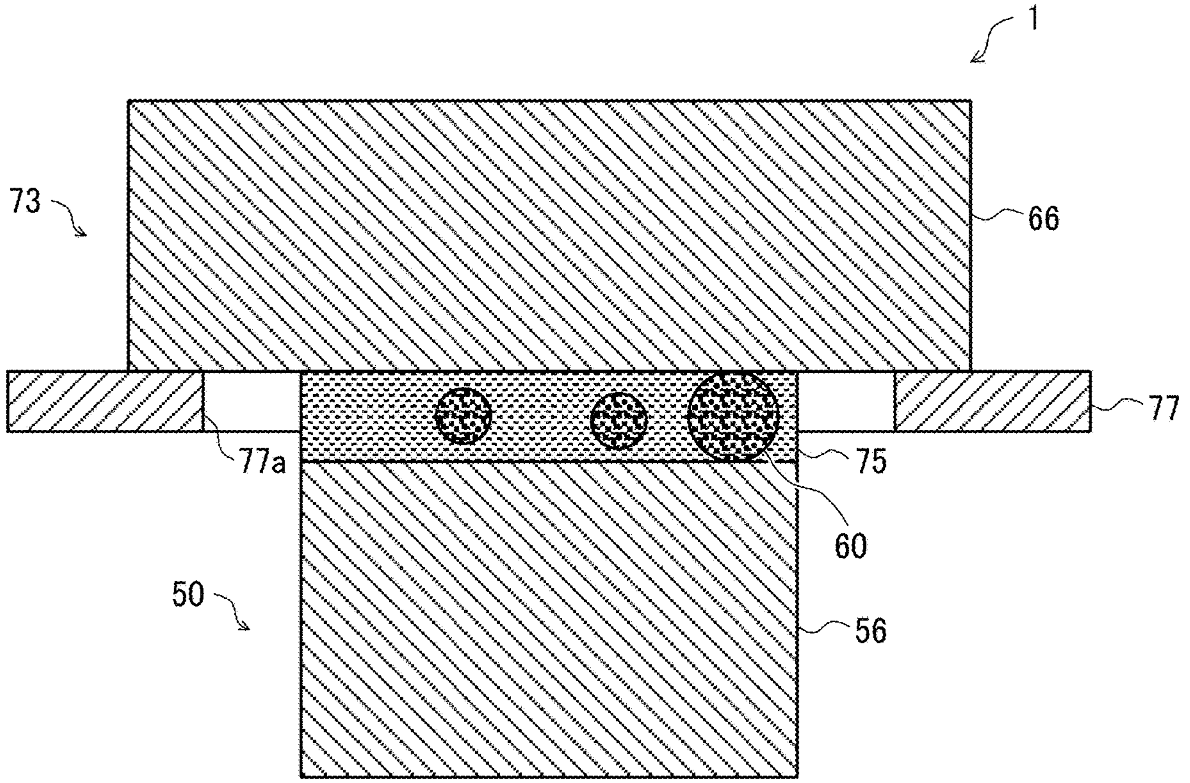
FIG. 5 is an enlarged view of the bonded portion in the center of the liquid discharge head according to a first embodiment of the present disclosure.

FIG. 5 is an enlarged view of a bonded portion between a partition wall 56 of the piezoelectric element holding substrate 50, a damper 77, and a partition wall 66 of the damper holding substrate 73 at the center of a liquid discharge head 1 according to a first embodiment of the present disclosure. The liquid discharge head 1 is different from the above-described liquid discharge head 101 in that the liquid discharge head 1 includes the partition wall 56 as the first partition instead of the partition wall 59, the partition wall 66 as the second partition instead of the partition wall 69, and the damper 77 instead of the damper 74. The other configurations are the same as that of the liquid discharge head 101.

The partition wall 56 separates the supply-side common channel 71 and the collection-side common channel 72 (i.e., the first side spaces) similarly to the partition wall 59, and a width of the partition wall 56 is narrower than the width of the partition wall 59. The partition wall 66 separates the second side spaces 67 and 68 similarly to the partition wall 69, and a width of the partition wall 66 is wider than the width of the partition wall 56. The damper 77 has a penetrating portion 77*a* which is a through hole penetrating the damper 77. The penetrating portion 77*a* is formed so as to correspond to the width of the partition wall 56. The penetrating portion 77*a* is wider than the width of the partition wall 56 and narrower than the width of the partition wall 66 in the present embodiment. The partition wall 56 is directly secured to the partition wall 66 by the adhesive 75 containing the fillers 60.

In the liquid discharge head 1 according to the above-described embodiment, the partition wall 66 is wider than the partition wall 56, and the damper 77 has the penetrating portion 77*a*. With this configuration, since the fillers 60 contained in the adhesive 75 are positioned in the penetrating portion 77*a*, the fillers 60 does not interfere with the damper 77, thereby preventing the local stress due to the fillers 60 from acting on the damper 77. As a result, the stress does not locally concentrate on the damper 77 and does not damage the damper 77. Further, since the damper 77 is held by the damper holding substrate 73, the damper 77 can sufficiently dissipates the vibration energy of the liquid to dampen impact or amplitude of vibration.

Figure 13:
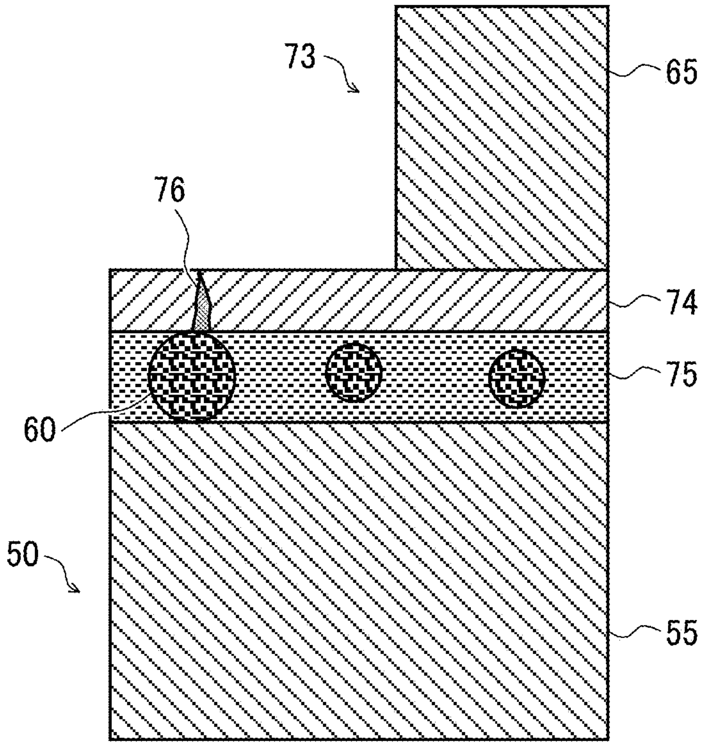
FIG. 13 is an enlarged view of a bonded portion between the piezoelectric element holding substrate, the damper, and the damper holding substrate at an end of the liquid discharge head according to the comparative example.

FIG. 13 is an enlarged view of a portion B in FIG. 3, i.e., a bonded portion between the side wall 55 of the piezoelectric element holding substrate 50, the damper 74, and the side wall 65 of the damper holding substrate 73 according to the comparative example. As illustrated in FIG. 13, the side wall 55 and the damper 74 are bonded to each other with the adhesive 75 described above.

Also in the configuration according to the comparative example illustrated in FIG. 13, a width of the side wall 65 is narrower than a width of the side wall 55 similarly to the configuration illustrated in FIG. 4. Similarly to the configuration illustrated in FIG. 4, the local stress is applied to the damper 74 by the filler 60, a crack 76 may be generated, and the damper 74 may be damaged.

Figure 14:
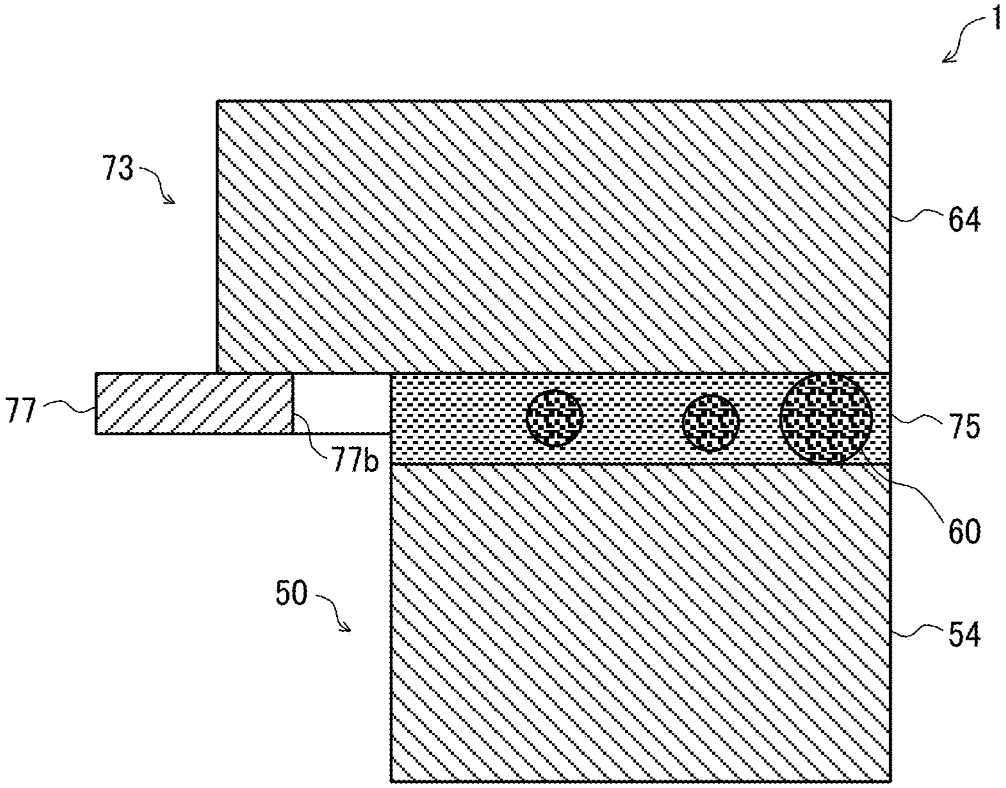
FIG. 14 is an enlarged view of the bonded portion at the end of the liquid discharge head according to the first embodiment of the present disclosure.

FIG. 14 is an enlarged view of a bonded portion between a side wall 54 of the piezoelectric element holding substrate 50, the damper 77, and a side wall 64 of the damper holding substrate 73 at the end of the liquid discharge head 1 according to the first embodiment of the present disclosure. The liquid discharge head 1 is different from the above-described liquid discharge head 101 in that the liquid discharge head 1 includes the side wall 54 as the first side wall instead of the side wall 55, the side wall 64 as the second side wall instead of the side wall 65, and the damper 77 instead of the damper 74. The other configurations are the same as that of the liquid discharge head 101.

The side walls 54 are disposed at both ends of the piezoelectric element holding substrate 50 similarly to the side walls 55, and a width of the side walls 54 is narrower than the width of the side walls 55. The side walls 64 are disposed at both ends of the damper holding substrate 73 similarly to the side walls 65, and a width of the side walls 64 is wider than the width of the side walls 54. The damper 77 has cutouts **77*b* at both ends thereof. Each of the cutouts 77*b* is formed so as to correspond to the width of the side wall 54. The cutout 77*b* is wider than the width of the side wall 54, and an edge of the cutout 77*b* is disposed outward from an inner edge of the side wall 64 in a width direction of the side wall 64 (the side wall 54) in the present embodiment. The side wall 54 is directly secured to the side wall 64 by the adhesive 75 containing the fillers 60. With this configuration, the stress does not locally concentrate on the damper 77 and does not damage the damper 77**.

Figure 16:
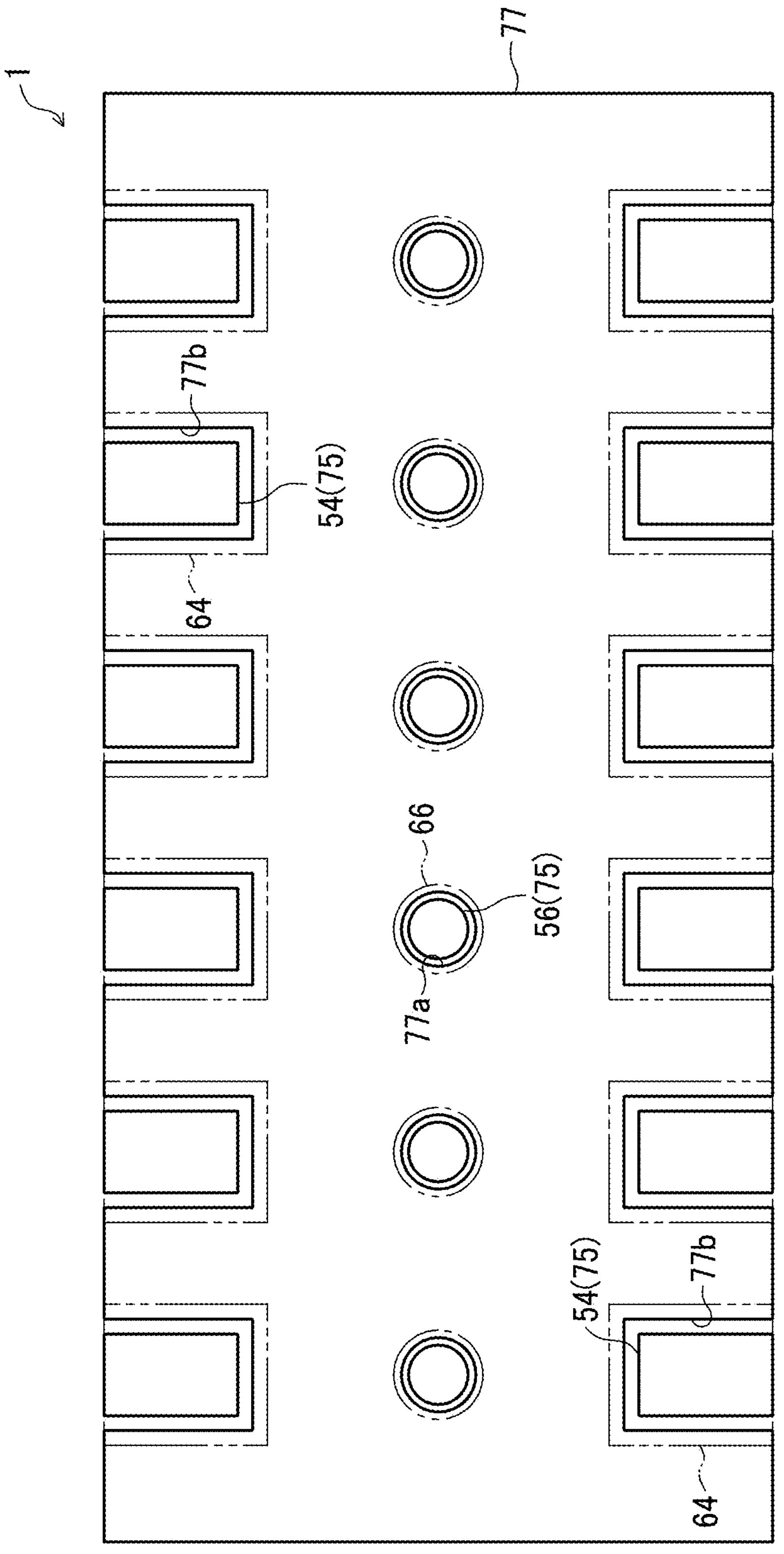
FIG. 16 is a schematic plan view of a bonded surface between the damper and the damper holding substrate of the liquid discharge head according to the first embodiment of the present disclosure.

FIG. 16 is a schematic plan view of a bonded surface between the damper 77 and the damper holding substrate 73 in the first embodiment of the present disclosure. In the first embodiment, each of 6 partition walls 56 and each of 6 partition walls 66 have a cylindrical shape, and each of 12 side walls 54 and each of 12 side walls 64 have a quadrangular prism shape. One set of the partition walls 56 and 66 and two sets of the side walls 54 and 64 correspond to each other to form the first side spaces (i.e., the supply-side common channel 71 and the collection-side common channel 72) and the second side spaces 67 and 68. In the present embodiment, 6 sets of the partition walls 56 and 66 and 12 sets of the side walls 54 and 64 are disposed at equal intervals. In the present embodiment, since the partition walls 56 and 66 have the cylindrical shape, the respective widths of the partition walls 56 and 66 are defined by diameter.

Figure 17:
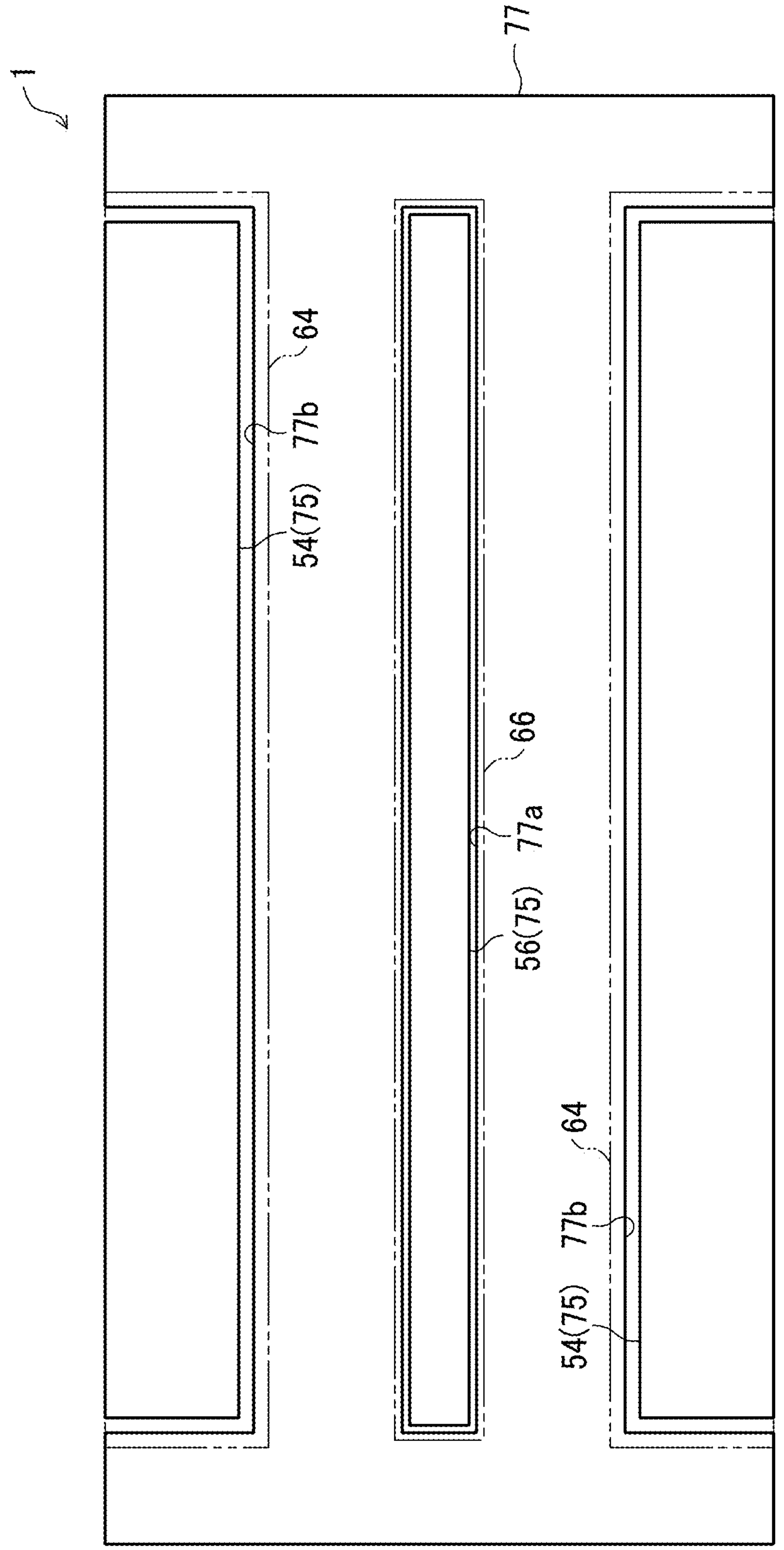
FIG. 17 is a schematic plan view of the bonded surface between the damper and the damper holding substrate of the liquid discharge head according to a modification of the first embodiment of the present disclosure.

FIG. 17 is a schematic plan view of a bonded surface between the damper 77 and the damper holding substrate 73 according to a modification of the first embodiment of the present disclosure. In this modification, each of the partition walls 56 and 66 and the side walls 54 and 64 has a quadrangular prism shape. One set of the partition walls 56 and 66 and two sets of the side walls 54 and 64 correspond to each other to form the first side spaces (i.e., the supply-side common channel 71 and the collection-side common channel 72) and the second side spaces 67 and 68.

In the above-described configuration, the damper 77 has a compliance (i.e., a volume change rate per reference pressure) of 7E-17 or more, and Young's modulus of 3 to 200 GPa. The damper 77 having such properties can dissipate the vibration energy of the liquid to dampen impact or amplitude of vibration. Since the damper 77 has a laminated structure including a plurality of layers, the physical properties of the damper 77 formed by film formation can be changed as desired.

Figure 6:
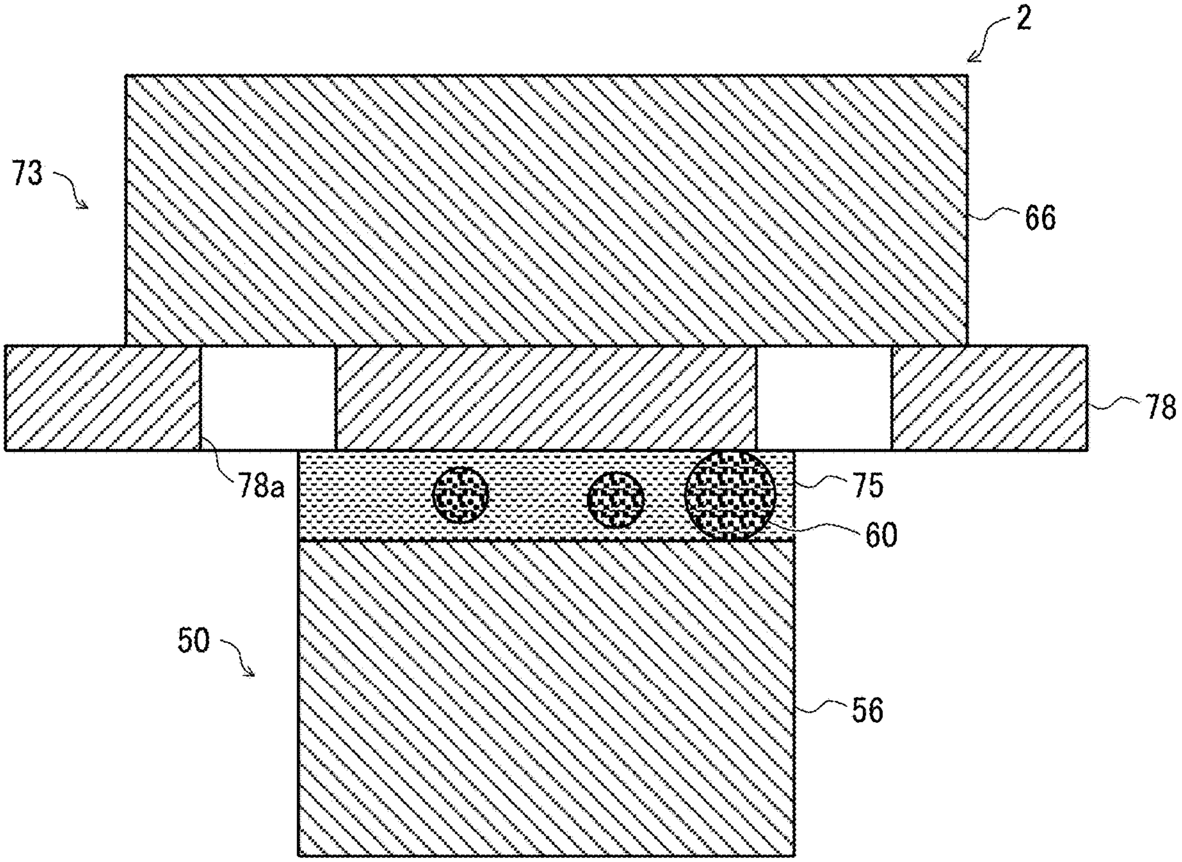
FIG. 6 is an enlarged view of the bonded portion in the center of the liquid discharge head according to a second embodiment of the present disclosure.

FIG. 6 is an enlarged view of a bonded portion between the partition wall 56, a damper 78, and the partition wall 66 at the center of a liquid discharge head 2 according to a second embodiment of the present disclosure. The liquid discharge head 2 is different from the above-described liquid discharge head 1 only in that the liquid discharge head 2 includes the damper 78 instead of the damper 77. The other configurations are the same as that of the liquid discharge head 1.

The damper 78 has a penetrating portion **78*a* which is a through hole penetrating the damper 78. The penetrating portions 78*a* are formed so as to correspond to the width of the partition wall 56. In other words, the penetrating portions 78*a* are opposed to both edges of the partition wall 56, respectively, but not opposed to the center of the partition wall 56 in the present embodiment. In addition, the penetrating portions 78*a* are disposed inward from edges of the partition wall 66 in a width direction of the partition wall 66 (the partition wall 56), in other words, at an interior of the edges of the partition wall 66. The partition wall 56 is secured to the damper 78 between the penetrating portions 78*a* by the adhesive 75 containing the fillers 60. The damper 78 is thicker than the maximum diameter of the fillers 60, and a size of each penetrating portion 78*a* in a width direction is larger than the maximum diameter of the fillers 60**.

With this configuration, even if the fillers 60 in the adhesive 75 interfere with the damper 78, since the damper 78 is backed up by the partition wall 66, thereby preventing the local stress due to the fillers 60 from acting on the damper 78. As a result, the stress does not locally concentrate on the damper 78 and does not damage the damper 78. Further, since the damper 78 is thicker than the maximum diameter of the fillers 60 and the size of the penetrating portion **78*a* in the width direction is larger than the maximum diameter of the fillers 60, even if the filler 60 protrudes from the adhesive 75, the penetrating portion 78*a* can accommodate the filler 60 therein, thereby reliably preventing interference of the filler 60 with the damper 78**.

Figure 15:
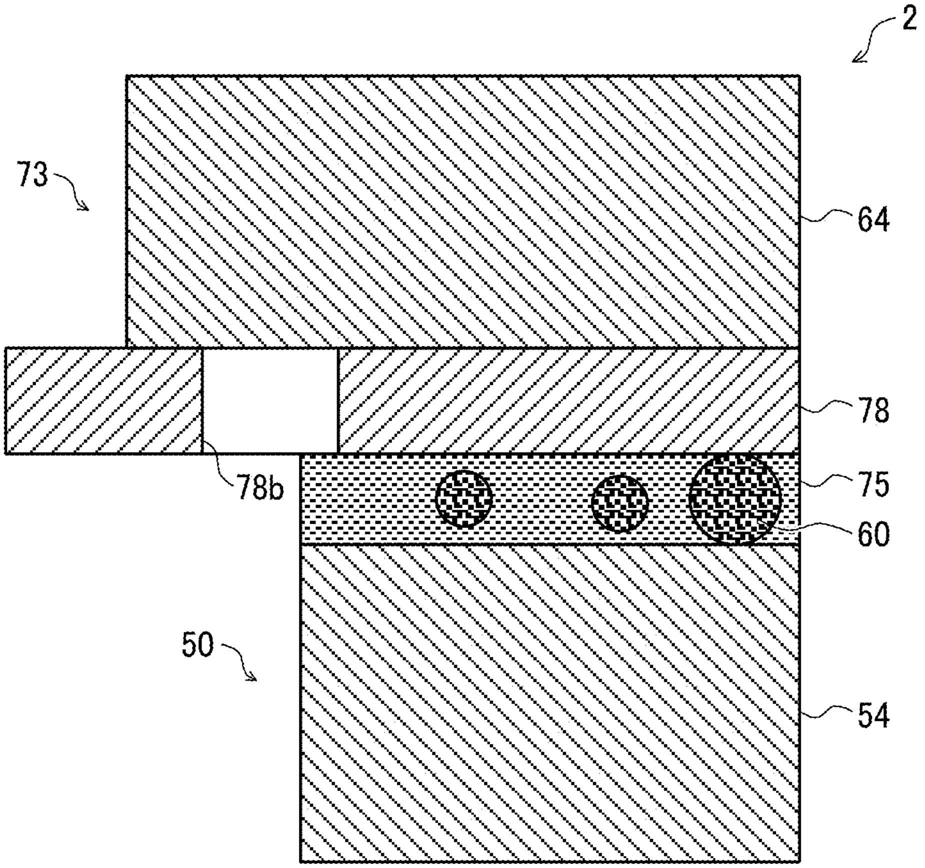
FIG. 15 is an enlarged view of the bonded portion at the end of the liquid discharge head according to the second embodiment of the present disclosure.

FIG. 15 is an enlarged view of the bonded portion between the side wall 54, the damper 78, and the side wall 64 at the end of the liquid discharge head 2 according to the second embodiment of the present disclosure. The liquid discharge head 2 is different from the above-described liquid discharge head 1 only in that the liquid discharge head 2 includes the damper 78 instead of the damper 77. The other configurations are the same as that of the liquid discharge head 1.

The damper 78 has cutouts **78*b* at both end portions. Each of the cutouts 78*b* is formed so as to correspond to the width of the side wall 54. Specifically, the cutout 78*b* is opposed to an inner edge of the side wall 54 in the present embodiment. In addition, the cutout 78*b* is disposed outward from the inner edge of the side wall 64 in the width direction. The side wall 54 is secured to the damper 78 by the adhesive 75 containing the fillers 60. With this configuration, the stress does not locally concentrate on the damper 78 and does not damage the damper 78**.

Figure 18:
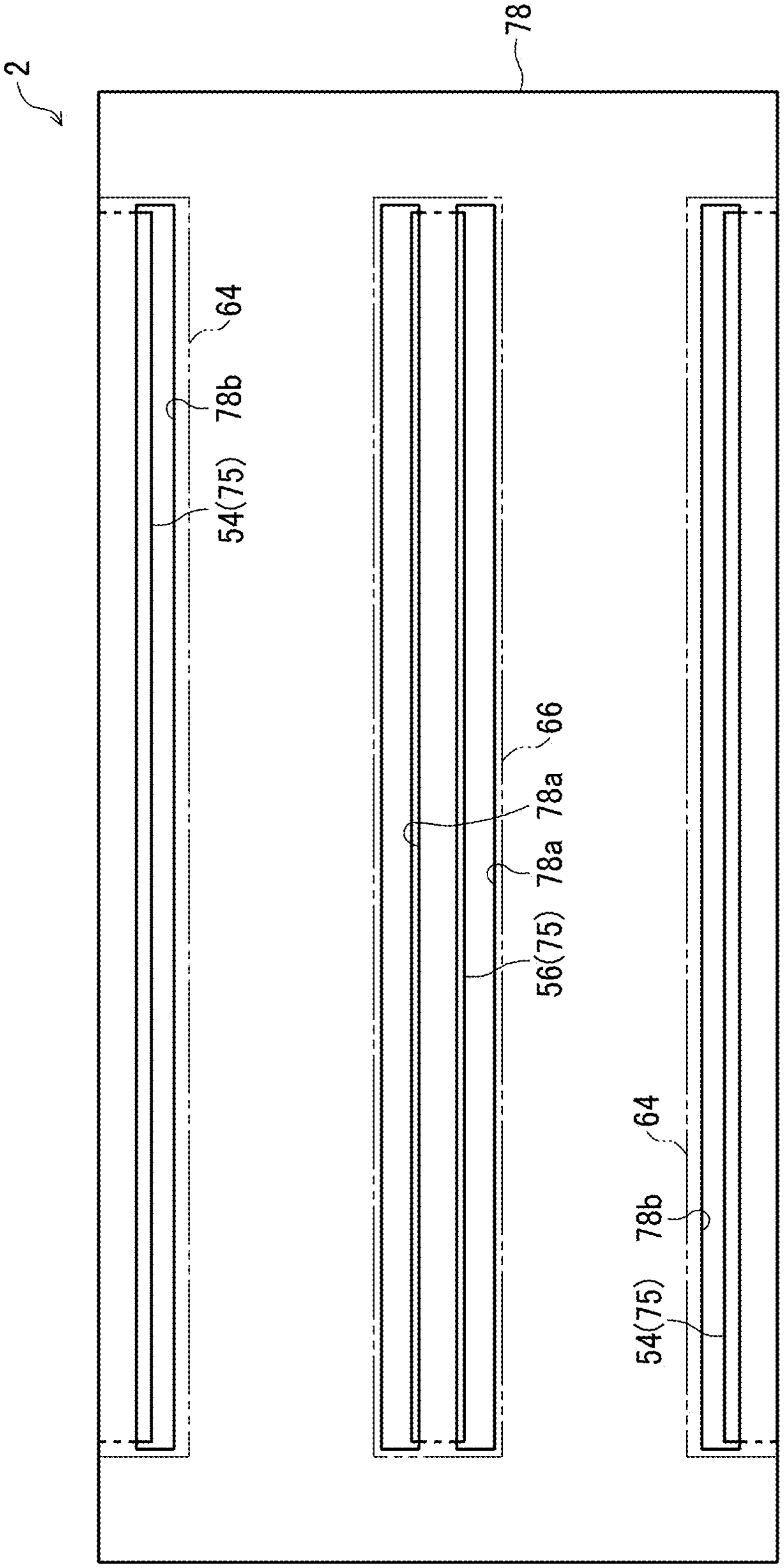
FIG. 18 is a schematic plan view of the bonded surface between the damper and the damper holding substrate of the liquid discharge head according to the second embodiment of the present disclosure.

FIG. 18 is a schematic plan view of a bonded surface between the damper 78 and the damper holding substrate 73 according to the second embodiment of the present disclosure. In the second embodiment, each of the partition walls 56 and 66 and the side walls 54 and 64 has a quadrangular prism shape. One set of the partition walls 56 and 66 and two sets of the side walls 54 and 64 correspond to each other to form the first side spaces (i.e., the supply-side common channel 71 and the collection-side common channel 72) and the second side spaces 67 and 68.

As illustrated in FIG. 18, the penetrating portion 78*a* is formed so as to correspond to the width of the partition wall 56. Specifically, the penetrating portions 78*a* are formed in the damper 78 so that the side edges of the partition wall 56 are exposed in the penetrating portions 78*a*.

In the above-described configuration, the damper 78 has the compliance of 7E-17 or more, and Young's modulus of 3 to 200 GPa. The damper 78 having such properties can dissipate the vibration energy of the liquid to dampen impact or amplitude of vibration. Since the damper 78 has a laminated structure including a plurality of layers, the physical properties of the damper 78 formed by film formation can be changed as desired.

Figure 7:
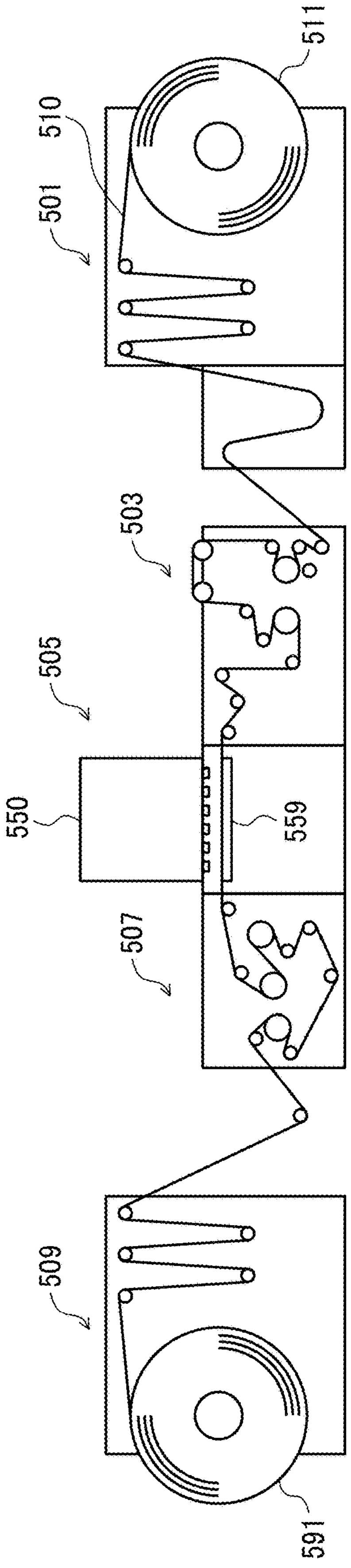
FIG. 7 is a schematic front view of a liquid discharge apparatus including the liquid discharge head according to embodiments of the present disclosure.
Figure 8:
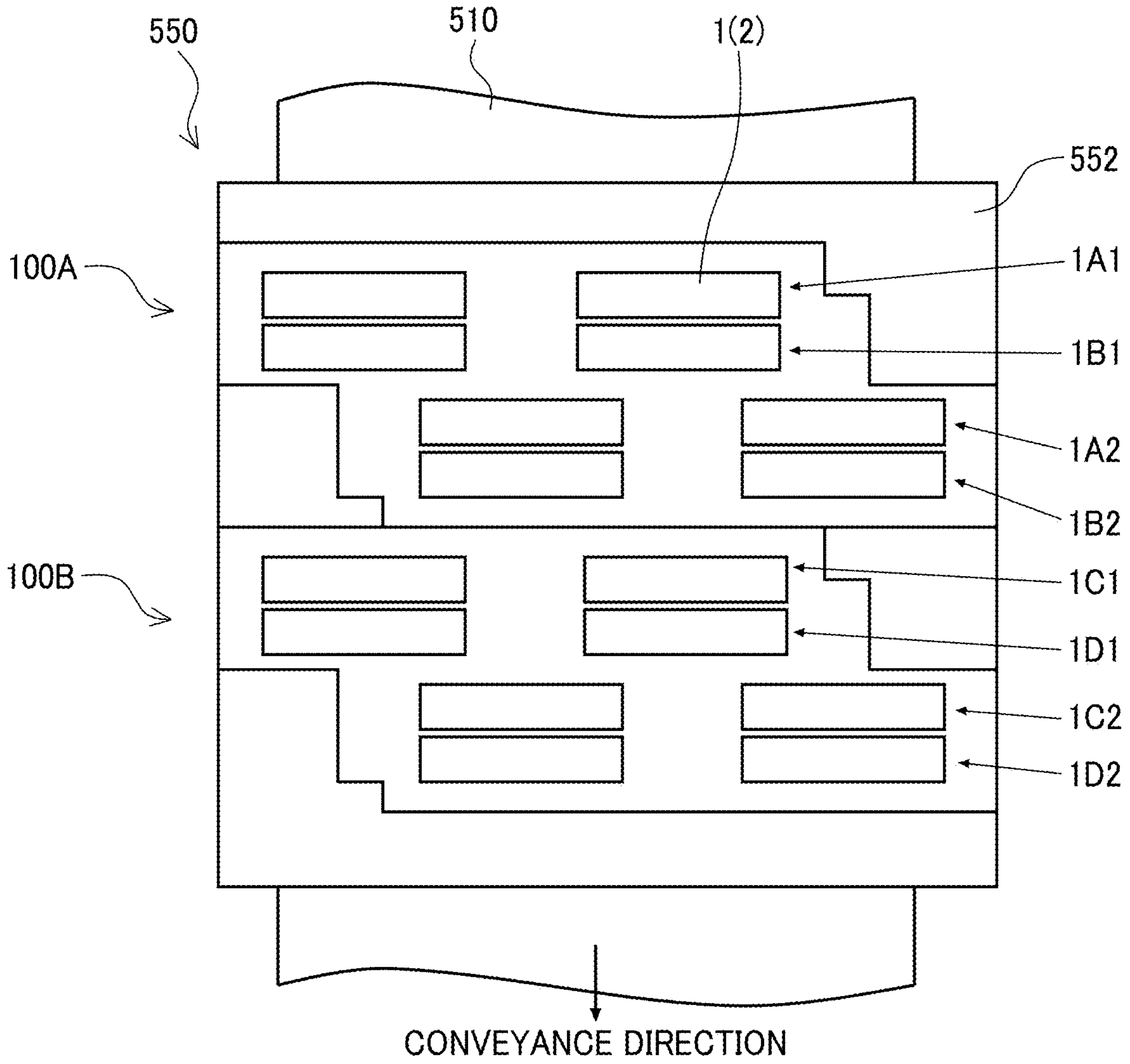
FIG. 8 is a schematic plan view of the liquid discharge device of the liquid discharge apparatus including the liquid discharge head according to embodiments of the present disclosure.

A liquid discharge apparatus including the above-described liquid discharge head 1 or 2 is described below. As illustrated in FIGS. 7 and 8, a printer 500 serving as the liquid discharge apparatus includes a feeder 501 to feed a continuous medium 510 as a recording medium, a guide conveyor 503 to guide and convey the continuous medium 510, fed from the feeder 501, to a printing unit 505. The printer 500 further includes the printing unit 505 to discharge a liquid onto the continuous medium 510 to form an image on the continuous medium 510, a dryer 507 to dry the continuous medium 510 to which the liquid adheres, and a carrier 509 to feeds the dried continuous medium 510 outward.

The continuous medium 510 is fed from a winding roller 511 of the feeder 501, guided and conveyed with rollers of the feeder 501, the guide conveyor 503, the dryer 507, and the carrier 509, and wound around a take-up roller 591 of the carrier 509. In the printing unit 505, the continuous medium 510 is conveyed on a conveyance guide 559 so as to face a head unit 550 as a liquid discharge device. The head unit 550 discharges a liquid onto the continuous medium 510 to print an image.

As illustrated in FIG. 8, the printer 500 includes liquid discharge devices 100A and 100B, which are similar to the above-described liquid discharge device 100, in the head unit 550. The liquid discharge devices 100A and 100B are mounted on a common base 552.

The liquid discharge device 100A includes head arrays 1A1, 1B1, 1A2, and 1B2. Each of the head arrays 1A1, 1B1, 1A2, and 1B2 includes multiple liquid discharge heads 1 (or 2) arranged in a head array direction perpendicular to a conveyance direction of the continuous medium 510. The liquid discharge device 100B includes head arrays 1C1, 1D1, 1C2, and 1D2. Each of the head arrays 1C1, 1D1, 1C2, and 1D2 includes multiple liquid discharge heads 1 (or 2) arranged in the head array direction perpendicular to the conveyance direction of the continuous medium 510. The head arrays 1A1 and 1A2 of the liquid discharge device 100A discharge liquid of the same color. Similarly, the head arrays 1B1 and 1B2 of the liquid discharge device 100A are grouped as one set and discharge liquid of the same desired color. The head arrays 1C1 and 1C2 of the liquid discharge device 100B are grouped as one set and discharge liquid of the same desired color. The head arrays 1D1 and 1D2 of the liquid discharge device 100B are grouped as one set and discharge liquid of the same desired color.

Figure 9:
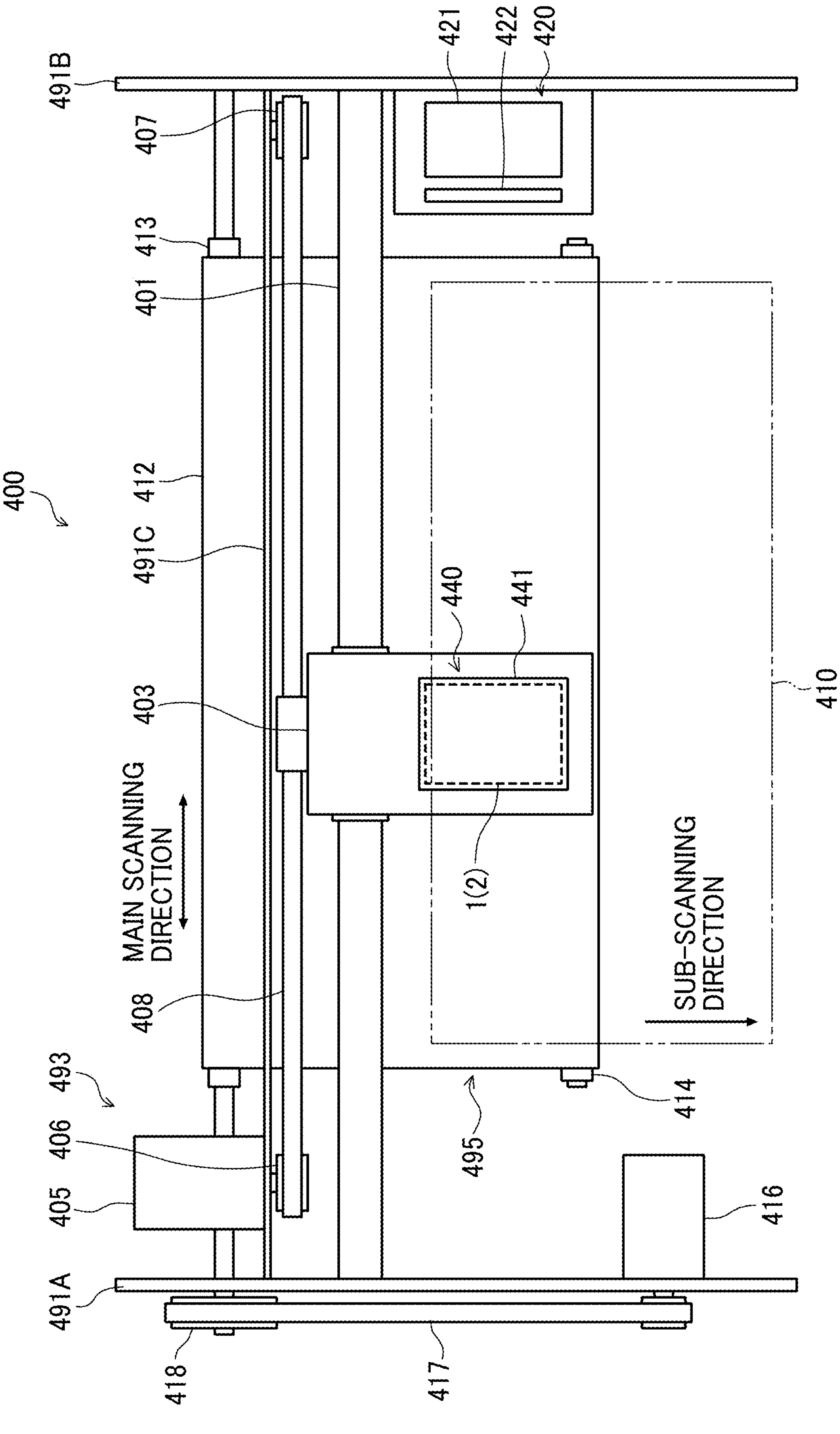
FIG. 9 is a schematic plan view of another liquid discharge apparatus including the liquid discharge head according to embodiments of the present disclosure.
Figure 10:
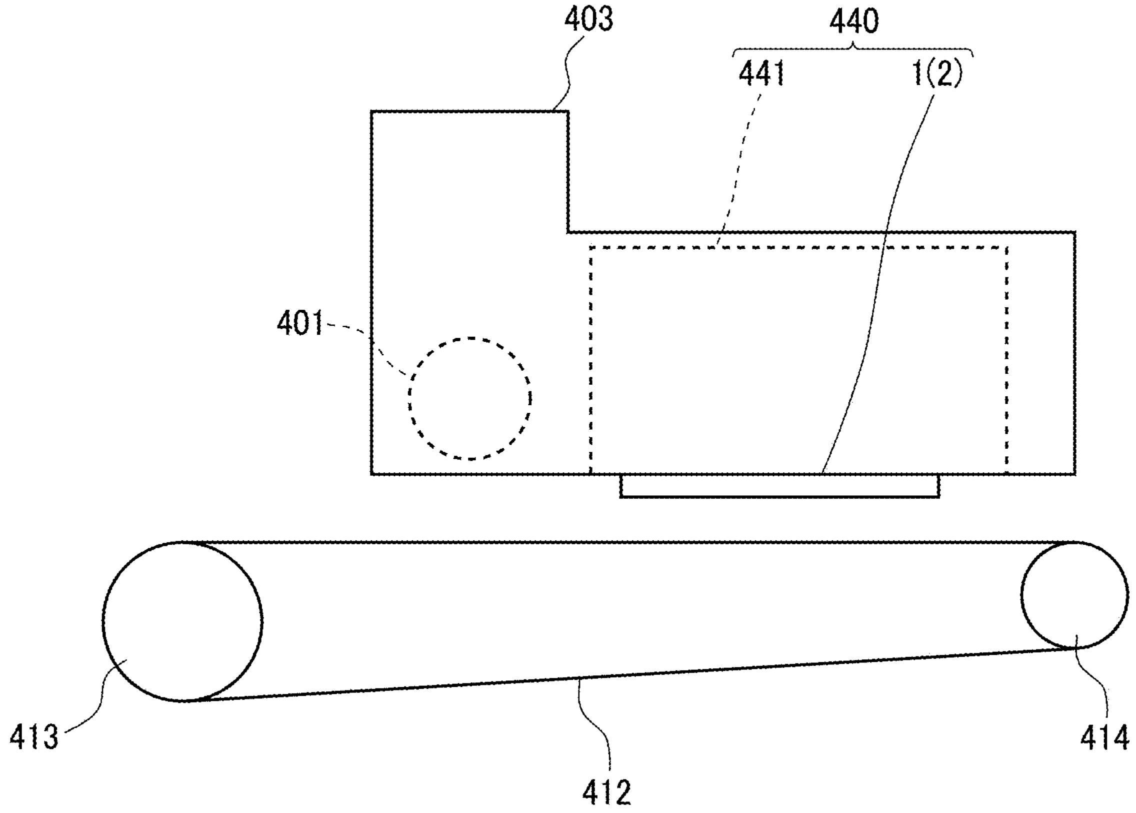
FIG. 10 is a schematic side view of another liquid discharge apparatus including the liquid discharge head according to embodiments of the present disclosure.

Another printer 400 as a liquid discharge apparatus according to the present embodiment is described below with reference to FIGS. 9 and 10. As the liquid discharge apparatus, the printer 400 is a serial type printing apparatus, and a main-scanning moving mechanism 493 reciprocally moves a carriage 403 in a main scanning direction. The main-scanning moving mechanism 493 includes a guide 401, a main scanning motor 405, and a timing belt 408. The guide 401 is bridged between left and right side plates 491A and 491B to moveably hold the carriage 403. The carriage 403 is reciprocally moved in the main scanning direction by driving force of the main scanning motor 405 transmitted via the timing belt 408 looped around a drive pulley 406 and a driven pulley 407.

The carriage 403 mounts a liquid discharge device 440 including the liquid discharge head 1 and a head tank 441 as a single integrated unit. The liquid discharge head 1 discharges color liquid of, for example, yellow (Y), cyan (C), magenta (M), and black (K). The liquid discharge head 1 is mounted on the liquid discharge device 440 such that a nozzle row including the multiple nozzles 11 is arranged in a sub-scanning direction perpendicular to the main scanning direction. The liquid discharge head 1 discharges the color liquid downward from the multiple nozzles 11. The liquid discharge head 1 is coupled to a liquid circulation device so that a liquid of a desired color is circulated and supplied to the liquid discharge head 1.

The printer 400 includes a conveyance mechanism 495 to convey a sheet 410 as the recording medium. The conveyance mechanism 495 includes a conveyance belt 412 as a conveyor and a sub-scanning motor 416 to drive the conveyance belt 412. The conveyance belt 412, which is an endless belt, is stretched between a conveyance roller 413 and a tension roller 414, and conveys the sheet 410 at a position facing the liquid discharge head 1 while attracting the sheet 410. The sheet 410 can be attracted to the conveyance belt 412 by electrostatic attraction, air suction, or the like. The conveyance belt 412 is circumferentially moved in the sub-scanning direction by driving force of the sub-scanning motor 416 transmitted via a timing belt 417 and a timing pulley 418.

On one side of the carriage 403 in the main scanning direction, a maintenance mechanism 420 that maintains and recovers the liquid discharge head 1 is disposed lateral to the conveyance belt 412. The maintenance mechanism 420 includes, for example, a cap 421 to cap a nozzle face (i.e., a face on which the multiple nozzles 11 are formed) of the liquid discharge head 1 and a wiper 422 to wipe the nozzle face. The main-scanning moving mechanism 493, the maintenance mechanism 420, and the conveyance mechanism 495 are mounted onto a housing including the side plates 491A and 491B and a back plate 491C.

In the printer 400 having the above-described configuration, the sheet 410 is attracted on the conveyance belt 412 and conveyed in the sub-scanning direction by the circumferential movement of the conveyance belt 412. The liquid discharge head 1 is driven in response to an image signal while the carriage 403 moves in the main scanning direction to discharge a liquid onto the sheet 410 not in motion, thereby forming an image.

Figure 11:
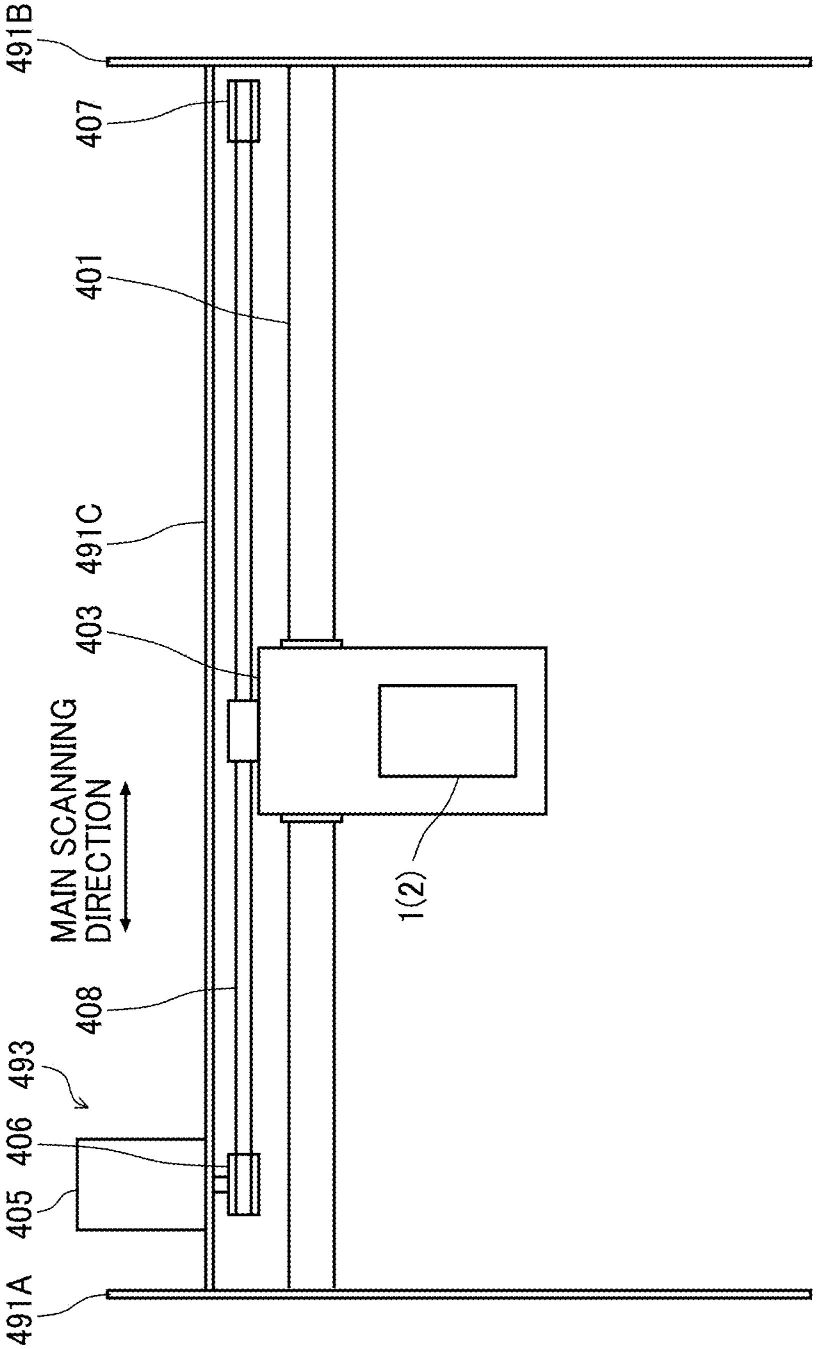
FIG. 11 is a schematic plan view of a liquid discharge device of another liquid discharge apparatus including the liquid discharge head according to embodiments of the present disclosure.

The above-described liquid discharge device 440 is described below with reference to FIG. 11. The liquid discharge device 440 includes the housing, the main-scanning moving mechanism 493, the carriage 403, and the liquid discharge head 1 among components of the printer 400 as the liquid discharge apparatus. The side plates 491A and 491B, and the back plate 491C construct the housing. Note that, in the liquid discharge device 440, the maintenance mechanism 420 described above may be mounted on, for example, the side plate 491B.

Figure 12:
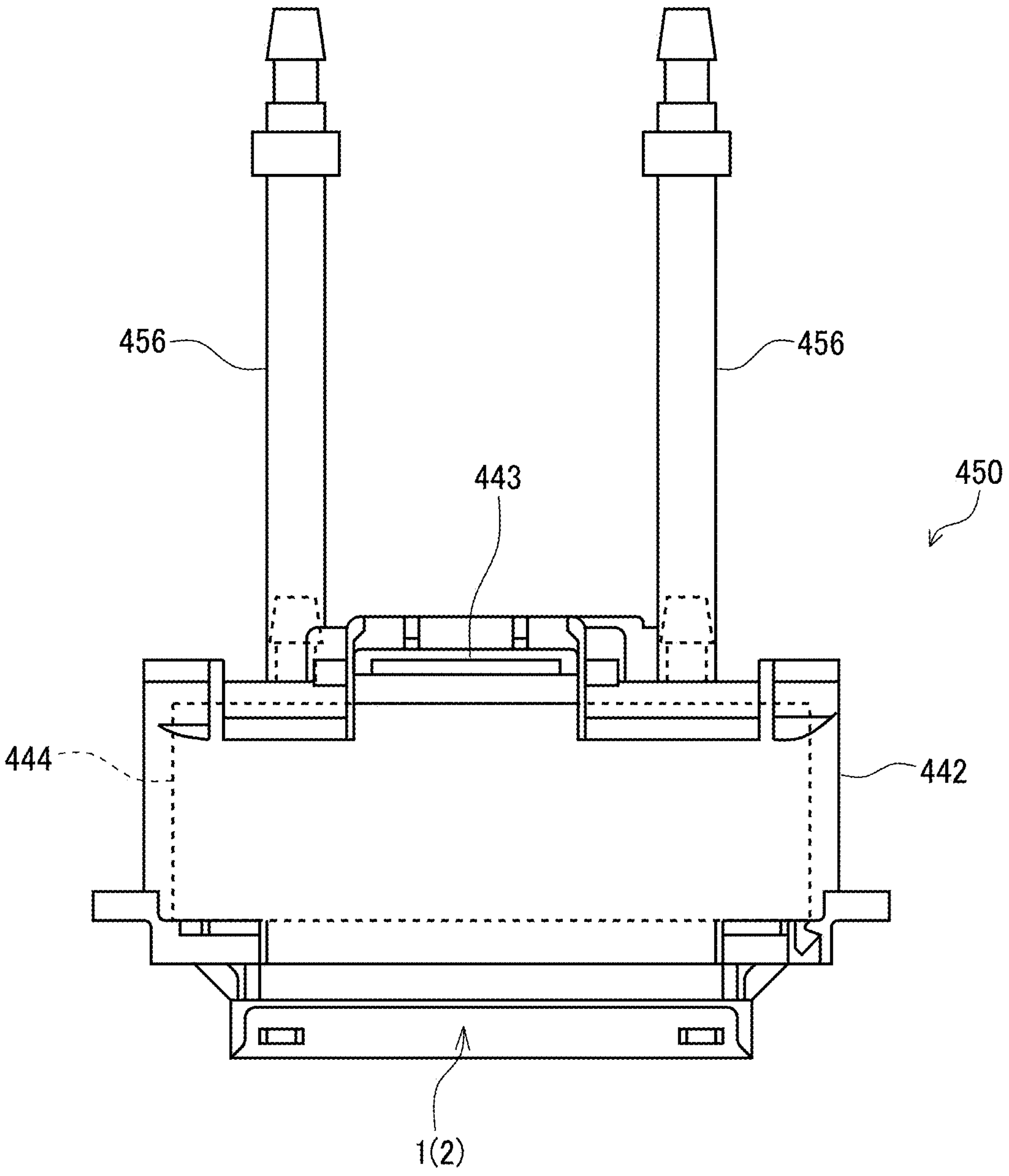
FIG. 12 is a schematic front view of another liquid discharge device of another liquid discharge apparatus including the liquid discharge head according to embodiments of the present disclosure.

Another liquid discharge device 450 according to the embodiments of the present disclosure is described below with reference to FIG. 12. The liquid discharge device 450 illustrated in FIG. 12 includes the liquid discharge head 1 to which a channel component 444 is attached, and a tube 456 connected to the channel component 444. The channel component 444 is disposed inside a cover 442, and a connector 443 for electrically connecting to the liquid discharge head 1 is provided on an upper portion of the channel component 444. In some embodiments, the liquid discharge device 440 may include the head tank 441 instead of the channel component 444.

Each of the liquid discharge devices 100, 100A, 100B, 440, 450, and 550 and each of the printers 400 and 500 as the liquid discharge apparatus, which includes the liquid discharge head 1 described above, can attain the same operational effects as the operational effects of the liquid discharge head 1 described above. Although the liquid discharge head 1 is used in each of the above-described configurations, the liquid discharge head 2 may be used instead of the liquid discharge head 1. In this case, the same operational effects as those of the liquid discharge head 2 can be attained.

In the present disclosure, the liquid to be used is not limited to a particular liquid as long as the liquid has a viscosity or surface tension to be discharged from a head (liquid discharge head). However, preferably, the viscosity of the liquid is not greater than 30 mPa-s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant. Such a solution, a suspension, or an emulsion can be used for, e.g., inkjet ink, surface treatment solution, or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and a counter electrode.

The "liquid discharge head" is not limited in the type of pressure generator used. In addition to the above-described piezoelectric actuator (which may use a laminated piezoelectric element), for example, a thermal actuator using a thermoelectric transducer such as a thermal resistor, and an electrostatic actuator including a diaphragm and a counter electrode can be used.

The "liquid discharge device" is an assembly of parts relating to liquid discharge. The term "liquid discharge device" represents a structure including the liquid discharge head and a functional part(s) or unit(s) combined with the liquid discharge head as a single unit. For example, the "liquid discharge device" includes a combination of the liquid discharge head with at least one of a head tank, a carriage, a supply mechanism, a maintenance mechanism, a main-scanning moving mechanism, and a liquid circulation device.

Here, the integrated unit may be, for example, a combination in which the liquid discharge head and a functional part(s) are secured to each other through, e.g., fastening, bonding, or engaging, and a combination in which one of the liquid discharge head and a functional part(s) is movably held by another. The liquid discharge head may be detachably attached to the functional part(s) or unit(s) each other.

The liquid discharge head and the head tank may be assembled, or the liquid discharge head and the head tank may be coupled (connected) to each other via a tube or the like to form the liquid discharge device as a single unit. Here, a unit including a filter may further be added to a portion between the head tank and the liquid discharge head of the liquid discharge device.

The liquid discharge device may be an integrated unit in which the liquid discharge head and the carriage are integrated as a single unit, or the liquid discharge head, the carriage, and the main-scanning moving mechanism are integrated as a single unit. As yet another example, the liquid discharge device is a unit in which the liquid discharge head and the main-scanning moving mechanism are combined into a single unit. The liquid discharge head is movably held by a guide that is a part of the main-scanning moving mechanism.

In still another example, the cap that forms a part of the maintenance mechanism is secured to the carriage mounting the liquid discharge head so that the liquid discharge head, the carriage, and the maintenance mechanism are integrated as a single unit to form the liquid discharge device. Further, in still yet another example, the liquid discharge device includes a tube connected to the liquid discharge head mounting the head tank or the channel component so that the liquid discharge head and the supply mechanism are integrated as a single unit. Through the tubes, the liquid in a liquid storage source is supplied to the liquid discharge head.

The main-scanning moving mechanism may be a guide only. The supply mechanism may be a tube(s) only or a loading unit only.

The "liquid discharge device" includes a head module including the above-described liquid discharge head, and a head device with which the above-described functional components or mechanisms are combined to form a single unit.

The term "liquid discharge apparatus" used herein also represents an apparatus including the liquid discharge head, the liquid discharge device, the head module, or the head device to drive the liquid discharge head to discharge liquid. The term "liquid discharge apparatus" used here includes, in addition to apparatuses to discharge liquid to materials onto which liquid can adhere, apparatuses to discharge the liquid into gas (air) or liquid.

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a recording medium by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The term "material onto which liquid can adhere" described above represents a material onto which liquid is at least temporarily adhered, a material onto which liquid is adhered and fixed, or a material into which liquid is adhered to permeate. Examples of the "material onto which liquid can adhere" include recording media, such as paper sheet, recording paper, recording sheet of paper, film, and cloth, electronic components, such as electronic substrate and piezoelectric element, and media, such as powder layer, organ model, and testing cell. The "material onto which liquid can be adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The liquid discharge apparatus relatively moves the liquid discharge head and the material onto which liquid can adhere. Which of the liquid discharge head or the material onto which liquid can adhere is moved is not limited. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a surface of a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

Aspects of the present disclosure are, for example, as follows.

Aspect 1

A liquid discharge head includes a piezoelectric element, a first holding substrate, a second holding substrate, and damper. The first holding substrate has a recess accommodating the piezoelectric element, a first partition having a first width in a width direction of the first partition, and first side spaces partitioned by the first partition. The second holding substrate has a second partition having a second width wider than the first width in the width direction and second side spaces partitioned by the second partition. The damper is disposed between the first holding substrate and the second holding substrate. The damper has a first surface facing the first holding substrate, a second surface opposite to the first surface, and a penetrating portion penetrating through the damper. The second surface is bonded to the second partition of the second holding substrate. The penetrating portion is disposed adjacent to the second partition.

Aspect 2

In Aspect 1, the first partition of the first holding substrate is boded to the second partition of the second holding substrate through the penetrating portion with adhesive containing fillers. The penetrating portion is disposed adjacent to the adhesive and the second partition.

Aspect 3

In Aspect 1, the first surface of the damper is bonded to the first partition of the first holding substrate with adhesive containing fillers. The penetrating portion is disposed adjacent to the adhesive and the second partition.

Aspect 4

In Aspect 3, the penetrating portion is opposed to an edge of the first partition bonded to the damper and at an interior of an edge of the second partition bonded to the damper.

Aspect 5

In Aspect 4, a width of the penetrating portion in the width direction is larger than a maximum diameter of the fillers.

Aspect 6

In Aspect 5, a thickness of the damper is larger than the maximum diameter of the fillers.

Aspect 7

In any one of Aspects 1 to 6, the damper has a compliance of 7E-17 or more and Young's modulus of 3 to 200 GPa.

Aspect 8

In any one of Aspects 1 to 7, the damper includes a plurality of layers laminated in a thickness direction of the damper.

Aspect 9

A liquid discharge device includes the liquid discharge head according to any one of Aspects 1 to 8.

Aspect 10

A liquid discharge apparatus includes the liquid discharge device according to Aspect 9.

Aspect 11

A liquid discharge head includes a piezoelectric element, a first holding substrate, a second holding substrate, and damper. The first holding substrate has a recess accommodating the piezoelectric element, a first side wall having a first width in a width direction of the first side wall, and a first side space defined by the first side wall. The second holding substrate has a second side wall having a second width wider than the first width in the width direction and a second side space defined by the second side wall. The damper is disposed between the first holding substrate and the second holding substrate. The damper has a first surface facing the first holding substrate, a second surface opposite to the first surface, and a cutout penetrating through the damper. The second surface is bonded to the second side wall of the second holding substrate. The cutout is disposed adjacent to the second side wall.

The above-described embodiments are illustrative and do not limit the present disclosure. Thus, numerous additional modifications and variations are possible in light of the above teachings, unless otherwise specified.

The advantages achieved by the embodiments described above are examples and therefore are not limited to those described above.

According to the present disclosure, since the fillers contained in the adhesive are positioned in the penetrating portion, the fillers does not interfere with the damper, thereby preventing the local stress due to the fillers from acting on the damper. As a result, the stress does not locally concentrate on the damper and does not damage the damper, and the liquid discharge head that does not damage the damper can be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a piezoelectric element;

a first holding substrate having:

a recess accommodating the piezoelectric element;

a first partition having a first width in a width direction of the first partition; and first side spaces partitioned by the first partition:

a second holding substrate having:

a second partition having a second width wider than the first width in the width direction; and second side spaces partitioned by the second partition; and a damper between the first holding substrate and the second holding substrate, the damper having:

a first surface facing the first holding substrate;

a second surface opposite to the first surface, the second surface bonded to the second partition of the second holding substrate; and a penetrating portion penetrating through the damper, the penetrating portion adjacent to the second partition.

2. The liquid discharge head according to claim 1, wherein the first partition of the first holding substrate is boded to the second partition of the second holding substrate through the penetrating portion with adhesive containing fillers, and the penetrating portion is adjacent to the adhesive and the second partition.

3. The liquid discharge head according to claim 1, wherein the first surface of the damper is bonded to the first partition of the first holding substrate with adhesive containing fillers, and the penetrating portion is adjacent to the adhesive and the second partition.

4. The liquid discharge head according to claim 3, wherein the penetrating portion is:

opposed to an edge of the first partition bonded to the damper; and at an interior of an edge of the second partition bonded to the damper.

5. The liquid discharge head according to claim 4, wherein a width of the penetrating portion in the width direction is larger than a maximum diameter of the fillers.

6. The liquid discharge head according to claim 5, wherein a thickness of the damper is larger than the maximum diameter of the fillers.

7. The liquid discharge head according to claim 1, wherein the damper has a compliance of 7E-17 or more and Young's modulus of 3 to 200 GPa.

8. The liquid discharge head according to claim 1, wherein the damper includes a plurality of layers laminated in a thickness direction of the damper.

9. A liquid discharge device comprising the liquid discharge head according to claim 1.

10. A liquid discharge apparatus comprising the liquid discharge device according to claim 9.

11. A liquid discharge head comprising:

a piezoelectric element;

a first holding substrate having:

a recess accommodating the piezoelectric element;

a first side wall having a first width in a width direction of the first side wall; and a first side space defined by the first side wall;

a second holding substrate having:

a second side wall having a second width wider than the first width in the width direction; and a second side space defined by the second side wall; and a damper between the first holding substrate and the second holding substrate, the damper having:

a first surface facing the first holding substrate;

a second surface opposite to the first surface, the second surface bonded to the second side wall of the second holding substrate; and a cutout penetrating through the damper, the cutout adjacent to the second side wall.

* * * * *